United States Patent [19]
Naito

[11] Patent Number: 5,872,929
[45] Date of Patent: Feb. 16, 1999

[54] METHOD AND SYSTEM FOR MANAGING TERMINALS IN A NETWORK COMPUTING SYSTEM USING TERMINAL INFORMATION INCLUDING SESSION STATUS

[75] Inventor: Masaya Naito, Kawasaki, Japan

[73] Assignee: Fujitsu Limited, Japan

[21] Appl. No.: 651,585

[22] Filed: May 22, 1996

[30] Foreign Application Priority Data

May 26, 1995 [JP] Japan .................................. 7-128225

[51] Int. Cl.[6] .................................................. G06F 13/00
[52] U.S. Cl. ................................ 395/200.53; 395/200.57
[58] Field of Search ................................. 395/670, 677, 395/406, 200.3, 200.48, 200.31, 200.57, 200.32, 500.53, 200.54, 200.55, 200.56

[56] References Cited

U.S. PATENT DOCUMENTS

| | | | |
|---|---|---|---|
| 4,996,685 | 2/1991 | Farese et al. ............................ | 370/352 |
| 4,999,771 | 3/1991 | Ralph et al. ............................. | 395/281 |
| 5,165,020 | 11/1992 | Sudama et al. ..................... | 395/200.57 |
| 5,291,597 | 3/1994 | Shorter et al. ....................... | 395/406 R |

*Primary Examiner*—Parshotam S. Lall
*Assistant Examiner*—Viet Vu
*Attorney, Agent, or Firm*—Staas & Halsey

[57] ABSTRACT

A method and system for managing terminals in a network computing system in which a host computer and a plurality of terminals are interconnected via a front-end processor. The front-end processor employs a terminal manager to monitor its subordinate terminals and provide the host computer with terminal information of the terminals in session and an identification number of the front-end processor itself. A subordinate manager disposed in the host computer receives the terminal information and identification number from the terminal manager, and stores them into a subordinate information table for future reference in transactions with the terminals. The front-end processor has extended capability for managing the messages waiting for transmission services in a message queue. The front-end processor provides some functions such as inquiring the host status in advance, rearranging the transmission order, deleting invalidated messages, and redirecting messages to a predetermined alternative address.

17 Claims, 12 Drawing Sheets

| TERMINAL | TRANSACTION STATUS | CODE USED | PERFORMANCE LEVEL | FRONT-END PROCESSOR |
|---|---|---|---|---|
| 20 | 1 | ASCII | LEVEL-1 | 10 |
| 21 | 0 | ASCII | LEVEL-2 | 10 |
| 23 | 0 | EBCDIC | LEVEL-1 | 11 |
| : | : | : | : | : |
| : | : | : | : | : |
| : | : | : | : | : |

1: ACTIVATED
0: STANDBY

METHOD AND SYSTEM FOR MANAGING TERMINALS IN A NETWORK COMPUTING SYSTEM USING TERMINAL INFORMATION INCLUDING SESSION STATUS

BACKGROUND OF THE INVENTION

1. Field of the Invention

The present invention relates to a method and system for managing terminals in a network computing system where a host computer and a plurality of terminals are interconnected via a front-end processor. More specifically, it relates to a method and system for managing terminals to enable a host computer to have terminal status information updated in a timely manner for indicating which terminals are in session and whether the terminals in session are activated for transaction or not.

2. Description of the Related Art

The recent trend toward open system architecture in computer system solutions requires flexibility in networks to enable a diversity of host computers and terminals having different interfaces to be connected with each other. Such flexibility has been achieved using front-end processors between host computers and terminals to bridging a gap in their interface.

In a network computing system equipped with such front-end processors, each terminal establishes an active connection with a front-end processor associated thereto when the terminal (or a user of the terminal) logs into the system. In other words, a "session" is activated between the terminal and front-end processor. Since only the terminals in session can communicate with their upper layer computers, it is necessary for application programs running on the host computers to know which terminals are actually in session when they initiate a transaction, or an exchange of messages.

Figure 12:
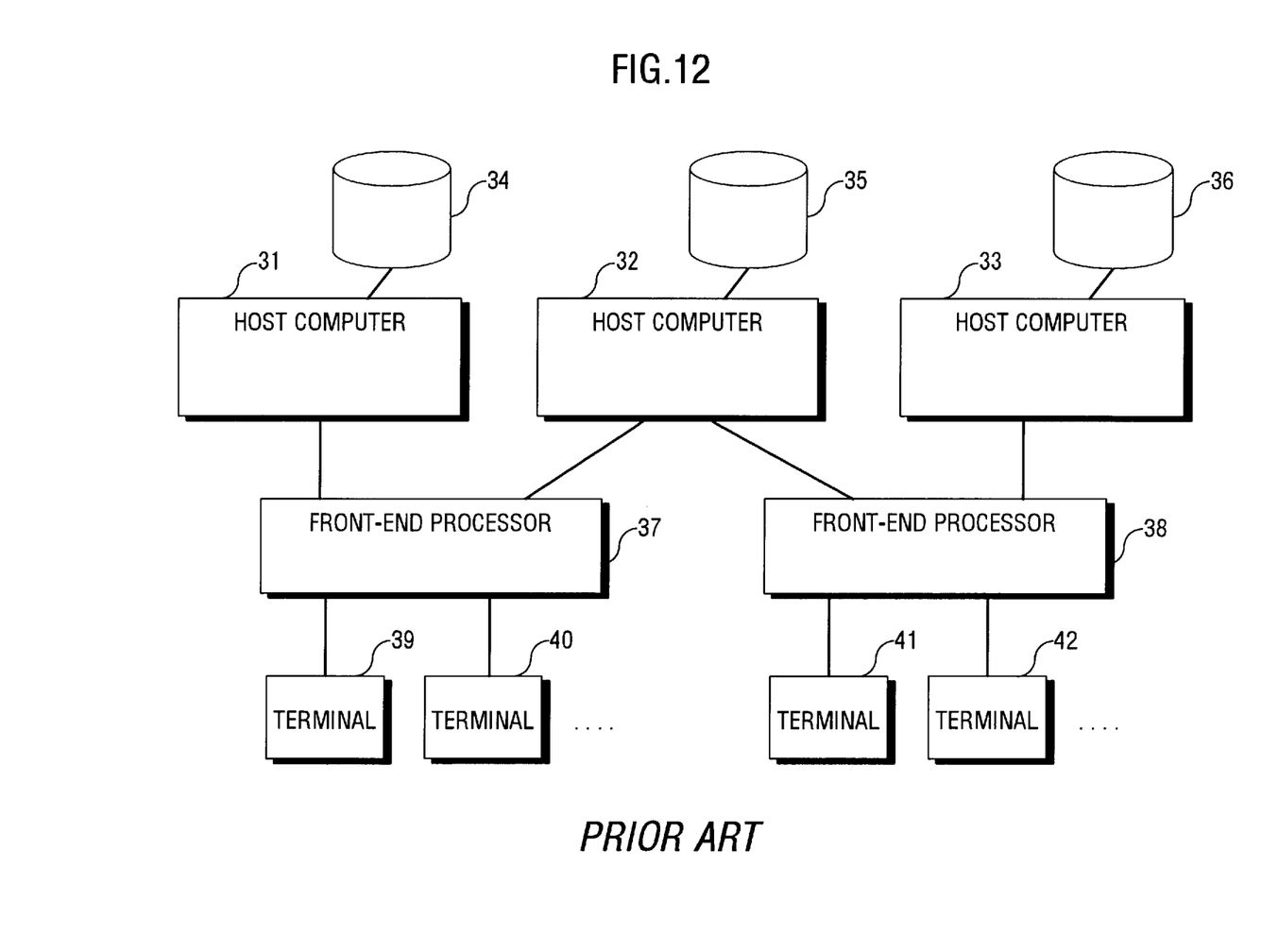
FIG. 12 is a diagram outlining a conventional terminal management scheme in a network computing system equipped with front-end processors.

FIG. 12 is a block diagram that outlines a terminal management scheme in a conventional network computing system using front-end processors. This computing system is organized by host computers 31–33, front-end processors 37–38, and terminals 39–42. Terminal management files 34–36 are provided for the host computers 31–33, respectively.

The front-end processors 37 and 38 provide links among the host computers 31–33 and the terminals 39–42 by mediating between two different interfaces. FIG. 12 shows several connection paths as:

| Host 31 | --- | [ FEP 37 -- Terminals 39, 40, . . . ] |
|---|---|---|
| Host 32 | -+- | [ FEP 37 -- Terminals 39, 40, . . . ] |
|  | +- | [ FEP 38 -- Terminals 41, 42, . . . ] |
| Host 33 | --- | [ FEP 38 -- Terminals 41, 42, . . . ] | where the terms "Host" and "FEP" denote "host computer" and "front-end processor," respectively.

For the host computers 31–33, the terminal management files 34–36 store the following information in a static fashion.

Unit identification numbers of their subordinate front-end processors and terminals Code system used in each terminal Performance level that indicates processing capability of each terminal With their respective terminal management files 34–36, the host computers 31–33 obtain terminal information regarding any terminal, such as whether it is their subordinate terminal, what performance level it provides, and which code system it uses.

In this conventional system, however, the host computers 31–33 do not always have session status information of the terminals 39–42 at hand. The session status can be only obtained by having a conversation with each terminal. In other words, the host computer is unable to know whether the session is activated between each terminal and its corresponding front-end processor, in advance of transaction with that terminal.

Another problem in the conventional system is that the terminal management files have to be modified each time the system configuration is changed.

SUMMARY OF THE INVENTION

Taking the above into consideration, a first object of the present invention is to provide a system for managing terminals in a network computing system, which enables the host computer to obtain up-to-date information regarding its subordinate terminals for use in data communication between the host computer and the terminals in session.

A second object of the present invention is to provide a system for managing terminals in a network computing system, which improves efficiency and utility in the process of message distribution performed by the front-end processor.

To accomplish the first object, according to the present invention, there is provided a system for managing terminals in a network computing system in which a host computer and a plurality of terminals are interconnected via a front-end processor. The system comprises the following elements.

The first element is a terminal manager means, disposed in the front-end processor, for sending terminal information to the host computer. The terminal information describes the terminals in session with the front-end processor. The second element is a subordinate information table disposed in the host computer for storing the terminal information received from the terminal manager. The third element is a subordinate management means disposed in the host computer for managing the terminal information in the subordinate information table for use in communication between the host computer and the terminals in session.

To accomplish the second object, according to the present invention, a system for managing terminals, further comprise a message transmission control means disposed in the front-end processor for controlling arrangement of messages in a message queue. The message transmission control means rearranges the messages in the message queue according to priority levels of the messages. The message transmission control means further deletes an invalid message that has become invalid as a result of execution of a high priority message. Still another function of the message transmission control means is to check validity of a destination address of each message arrived at the front-end processor and redirect the message to a predetermined alternative address, when the destination address is found invalid.

The above and other objects, features and advantages of the present invention will become apparent from the following description when taken in conjunction with the accompanying drawings which illustrate a preferred embodiment of the present invention by way of example.

DESCRIPTION OF THE PREFERRED EMBODIMENTS

An embodiment of the present invention will be described below with reference to the drawings.

Figure 1:
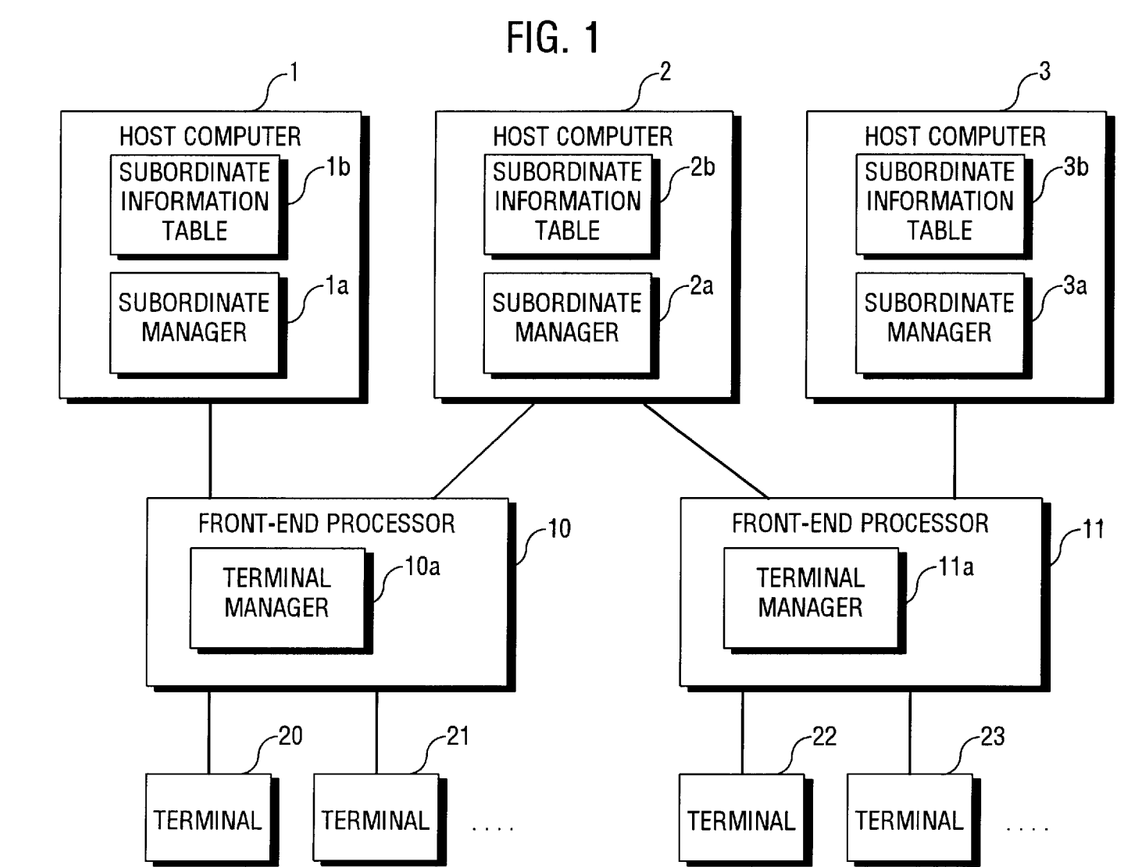
FIG. 1 is a diagram showing the basic structural arrangement of the present invention.

FIG. 1 shows the basic structural arrangement of the present invention, illustrating a three-layer system structure organized by host computers 1–3, front-end processors 10–11, and terminals 20–23 in contrast to the conventional system as seen in FIG. 12.

The front-end processors 10 and 11 have terminal managers 10a and 11a for monitoring their respective subordinate terminals. The terminal managers 10a and 11a send terminal information to their host computers on the upper layer. The terminal information includes session status, terminal ID number, transaction status, performance, and code system in each terminal. Together with the terminal information, the terminal managers 10a and 11a send their respective front-end processor identification (ID) numbers to the host computers 1–3.

The host computer 1 employs a subordinate manager 1a coupled to a subordinate information table 1b. The subordinate manager 1a receives the terminal information and front-end processor ID numbers from the terminal managers 10a and 11a in the front-end processors 10 and 11, and stores them into the subordinate information table 1b. Similarly, the other host computers 2 and 3 employ subordinate managers 2a and 3a and subordinate information tables 2b and 3b.

As described above, the present invention differs from the conventional system shown in FIG. 12 in having a subordinate manager and subordinate information table in each host computer and in having a terminal manager in each front-end processor.

Next, the basic operation steps in the terminal management system according to the present invention will be described below with reference to FIGS. 2 to 4.

Figure 2:
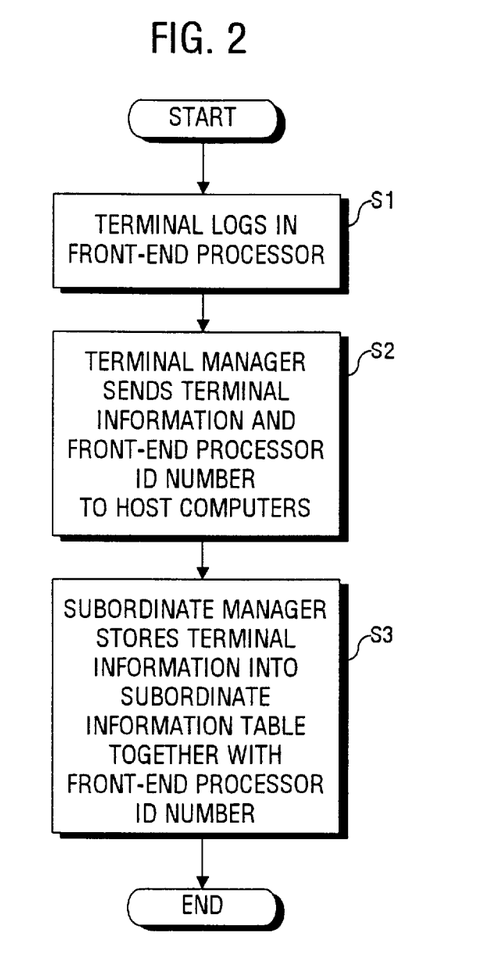
FIG. 2 is a flowchart showing a procedure when a terminal logs in a front-end processor.

FIG. 2 is a flowchart showing a procedure when a terminal logs in a front-end processor. Although there are no reference numerals used within the text in FIG. 2, the following description takes the host computers 1 and 2, front-end processor 10, and terminal 20 for illustration purposes.

[S1] The terminal 20 logs in the front-end processor 10 located on its upper layer.

[S2] In response to this log-in operation, the terminal manager 10a in the front-end processor 10 notifies the subordinate manager 1a and 2a in the host computers 1 and 2 of its own front-end processor ID number and the terminal information regarding the terminal 20.

[S3] The subordinate manager 1a in the host computer 1 stores the received terminal information into the subordinate information table 1b together with the ID number of the front-end processor 10. Likewise, subordinate manager 2a in the host computer 2 saves the received information into the subordinate information table 2b.

Most of the terminal information (i.e., session status, terminal ID number, code system, and performance level) and the front-end processor ID number are sent from the terminal manager to the subordinate manager when each terminal logs in the front-end processor. The transaction status, however, is sent to the subordinate manager when the terminal begins or ends a transaction with application programs in the host computer.

Figure 3:
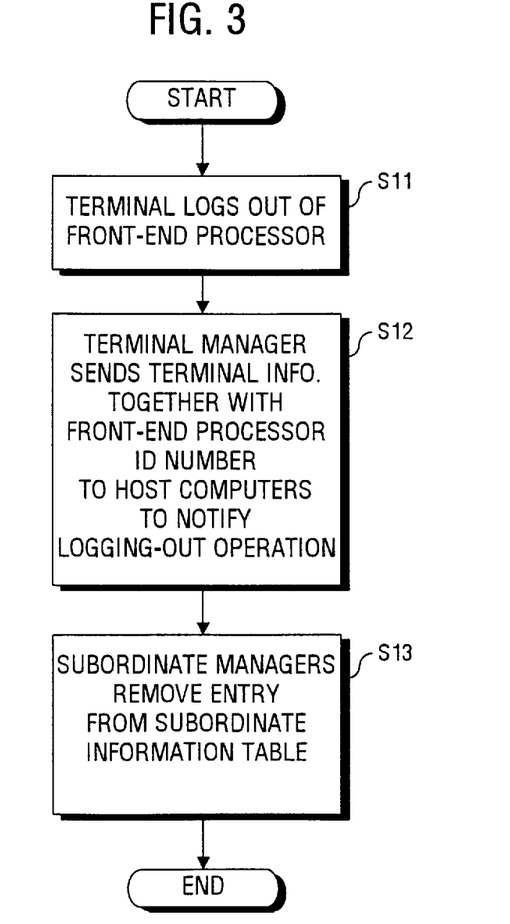
FIG. 3 is a flowchart showing a procedure when the terminal logs out of the front-end processor.

FIG. 3 is a flowchart showing a procedure when the terminal logs out of the front-end processor.

[S11] The terminal 20 logs out of the front-end processor 10.

[S12] In response to this logging-off operation, the terminal manager 10a in the front-end processor 10 sends its own front-end processor ID number and the terminal information to the subordinate managers 1a and 2a in the host computers 1 and 2, indicating that the session has been closed.

[S13] Based on the information received from the terminal manager 10a, the subordinate manager 1a in the host computer 1 removes the terminal information entry for the terminal 20 from the subordinate information table 1b. Likewise, the subordinate manager 2a in the host computer 2 removes the invalidated terminal information.

In the above-described step S2 of FIG. 2 and step S12 of FIG. 3, the front-end processor provides the host computers on the upper layer with the front-end processor ID number in addition to the terminal information. The host computers are linked with a plurality of front-end processors, making it possible for the host computers to know to which front-end processor the terminal has logged into. For instance, the host computer 2 has links to two front-end processors 10 and 11. Notification of the ID number from the front-end processor 10 allows the host computer 2 to learn that the terminal 20 is in session with the front-end processor 10.

The front-end processors, however, may omit the notification of their ID number when they are uniquely linked to their respective host computers with a one-to-one correspondence. The notification may also be omitted when the subordinate manager in each host computer functions to locate the sender every time it receives the terminal information.

Figure 4:
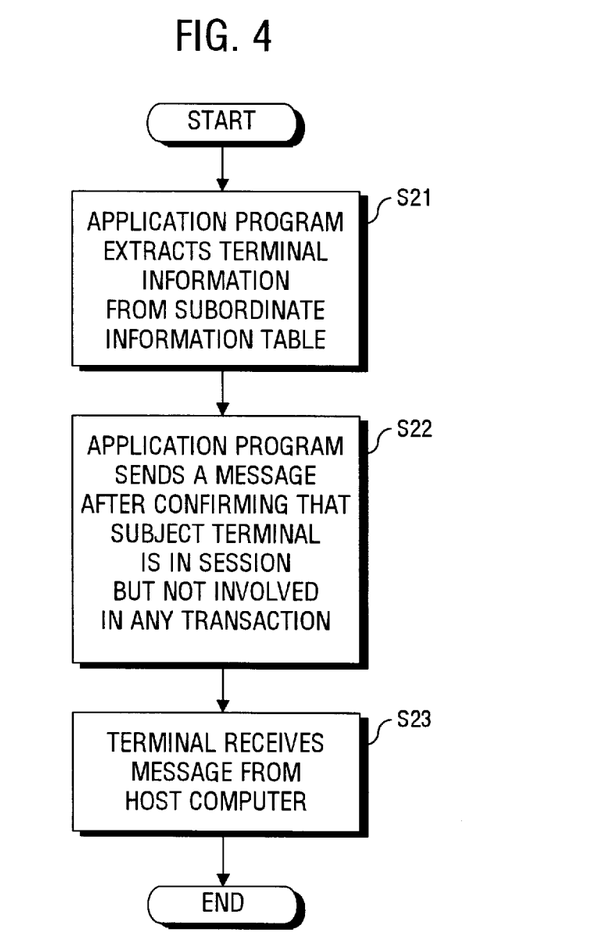
FIG. 4 is a flowchart showing a procedure when an application program in a host computer begins transaction with a terminal.

FIG. 4 is a flowchart showing a procedure when an application program in a host computer begins transaction with a terminal. The procedure consists of the following steps.

[S21] Out of the subordinate information table 1b, the application program in the host computer 1 retrieves terminal information for a specific terminal (say, the terminal 20) that the program is trying to communicate with.

[S22] With the retrieved terminal information, the application program confirms that the terminal 20 is in session and, if necessary, it further confirms that the terminal 20 is not involved in any transaction. Upon confirmation, the application program sends a message to the terminal 20.

[S23] The addressed terminal 20 receives the message from the host computer 1 via the front-end processor 10.

In the message transmission in step S22, the host computer may broadcast the same message to all the subordinate terminals that are in session but not involved in any other transaction at that time.

As described above, according to the present invention, the front-end processor provides the host computers with terminal information together with the front-end processor ID number of itself. The terminal information describes the subordinate terminals of the front-end processor, specifically indicating their session status, terminal ID number, transaction status, performance, and code system. It is possible to add any other data to the terminal information if required. It should be noted here that the scope of the term "terminal" is not restricted to simple peripheral devices but may include intelligent terminals or any computers that are remotely located and connected via networks.

Next, more detailed description of the terminal management method according to the present invention will be described below with reference to FIGS. 5 to 9.

Figure 5:
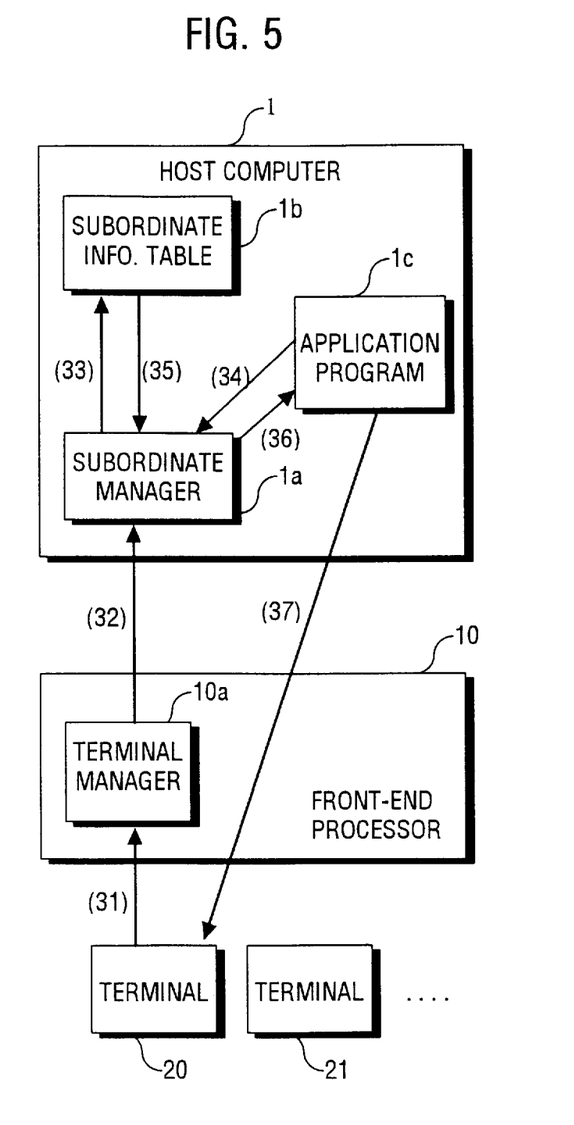
FIG. 5 is a diagram showing how an application program in a host computer begins transaction with a terminal in session.

FIG. 5 is a schematic diagram which shows how an application program in a host computer begins a transaction with a terminal. Since the configuration of FIG. 5 is a subset of the system shown in FIG. 1, it maintains the consistent reference numerals for the common elements. FIG. 5 illustrates an application program 1c in the host computer 1 that is trying to interact with one of its subordinate terminals. Arrows with parenthesized numerals indicate actions or data flow between the elements. The numerals are actually the step numbers in FIG. 6, which shows the operation of this system in a form of flowchart.

Figure 6:
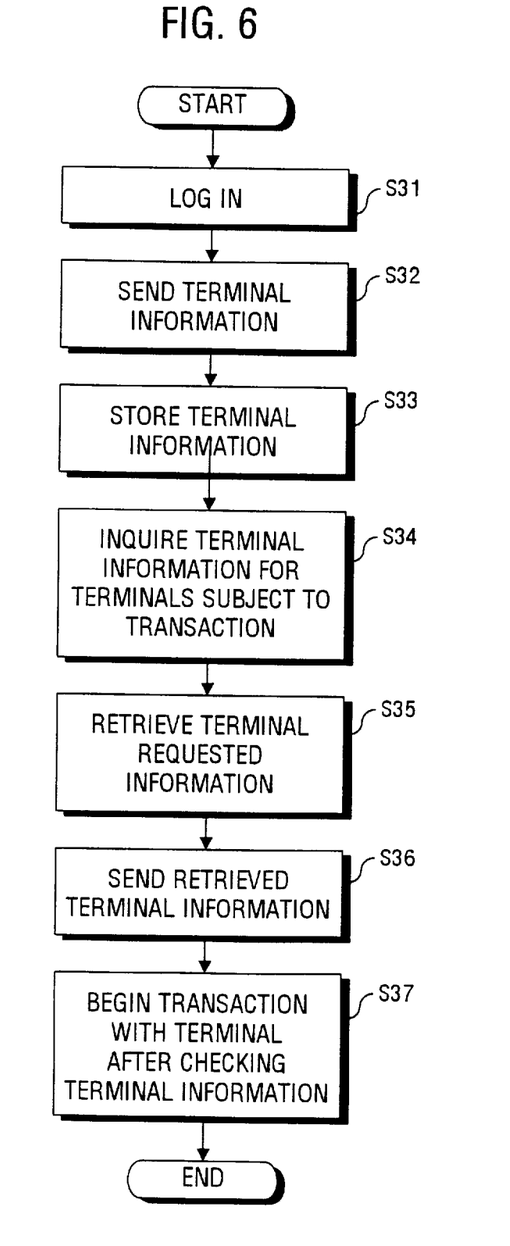
FIG. 6 is a flowchart showing a procedure when the application program in the host computer begins transaction with the terminal in session.

[S31] The terminal 20 logs in the front-end processor 10.

[S32] In response to this logging-in operation, the terminal manager 10a sends terminal information of the terminal 20 to the subordinate manager 1a in the host computer 1.

[S33] The subordinate manager 1a registers the received information to its subordinate information table 1b.

[S34] The application program 1c makes an inquiry about the terminal 20 to the subordinate manager 1a before initiating a transaction with the terminal 20.

[S35] The subordinate manager 1a extracts the requested terminal information from the subordinate information table 1b.

[S36] The subordinate manager 1a sends the extracted terminal information to the application program 1c.

[S37] Based on the received terminal information, the application program 1c confirms that the terminal 20 is not involved in any transaction and understands what code system is used in the terminal 20. After the confirmation is finished, the application program 1c begins a transaction with the terminal 20 through the front-end processor 10.

Figure 7:
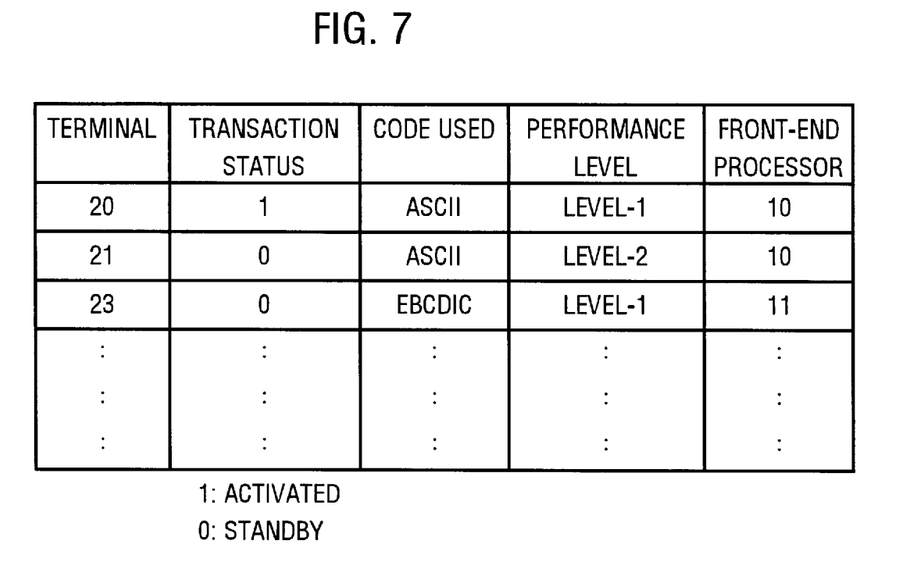
FIG. 7 is a diagram outlining the structure of a subordinate information table.

FIG. 7 outlines the structure of the subordinate information table 2b in the host computer 2. The table contains the following information for each terminal in session.

terminal ID number
transaction status (i.e., whether the terminal is just on standby or actually exchanging messages)
code system used in each terminal
performance level (i.e., processing throughput of each terminal)
front-end processor ID number Instead of having a dedicated subordinate information table locally as the host computers in FIG. 1 do, the system may be configured, as an alternative solution, so that a plurality of host computers will share the same table.

Next, various message management functions will be described below with reference to FIGS. 8–11. The front-end processors have message queues for buffering every message exchanged between host computers and terminals. According to the present invention, the front-end processors provide the following intelligent functions.

(1) The front-end processor inquires of the host computer its status before sending the terminal information and the like thereto. Based on the acquired status information, the front-end processor determines whether it sends the information. This function may be applied to time-consuming tasks such as transferring a large data file. The front-end processor sends such tasks to an appropriate host computer whose workload is relatively low.

(2) The front-end processor has a message queue prepared for each destination address to store prioritized messages sent from host computers or terminals. The front-end processor changes the entries of the message queue based on the priority attached to the messages.

(3) When some messages in the queue have become invalid as a result of execution of another message having a higher priority, the front-end processor removes these invalidated messages from the queue.

(4) When some messages in the queue are found inappropriate for execution in the current destination address, the front-end processor forwards them to another address that is previously determined as an alternative destination address.

Further, the front-end processor may suspend or terminate the current message exchange, and initiate another transaction with the terminals in session, based on the priority of each message.

Figure 8:
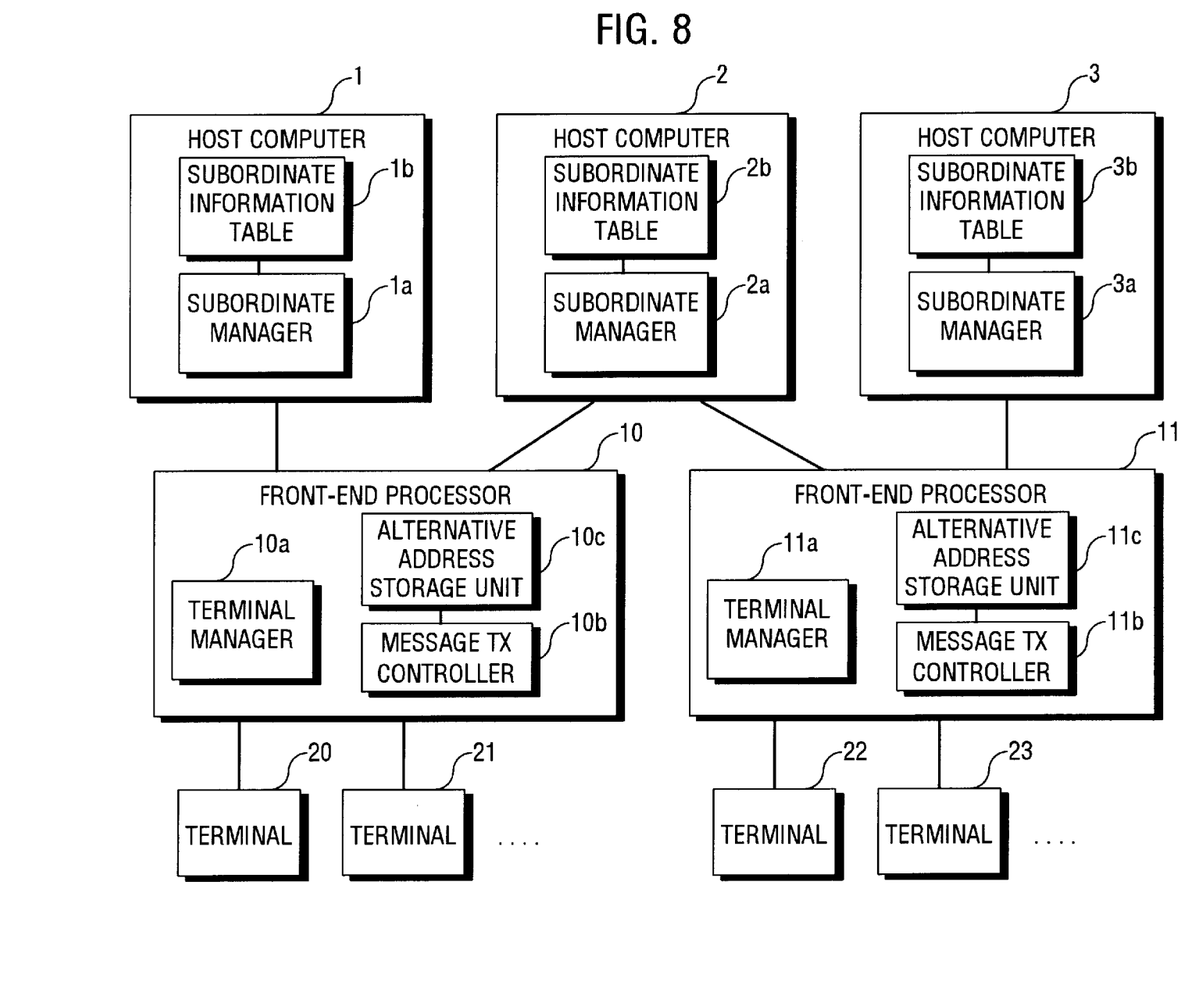
FIG. 8 is a diagram outlining a network computing system with a front-end processor having a variety of functions for message transmission control.

FIG. 8 is a diagram outlining a network computing system with a front-end processor having a variety of functions for message transmission management as described above.

In this system, the front-end processors 10 and 11 employ message transmission controllers 10b and 11b and alternative address storage units 10c and 11c, respectively.

In the alternative address storage units 10c and 11c, an address B is defined as an alternative destination for the messages that have been originally posted to a specific terminal or host computer with address A. If the terminal or computer of address A has become unable to communicate, the messages will be redirected to the address B.

The message transmission controllers 10b and 11b provide the following services for messages in a queue:
(1) rearrangement of the order of transmission
(2) deletion of some specific messages
(3) redirection of messages.
Those three services (1) to (3) will be now explained in this order with reference to FIGS. 9 to 11, respectively.

Figure 9:
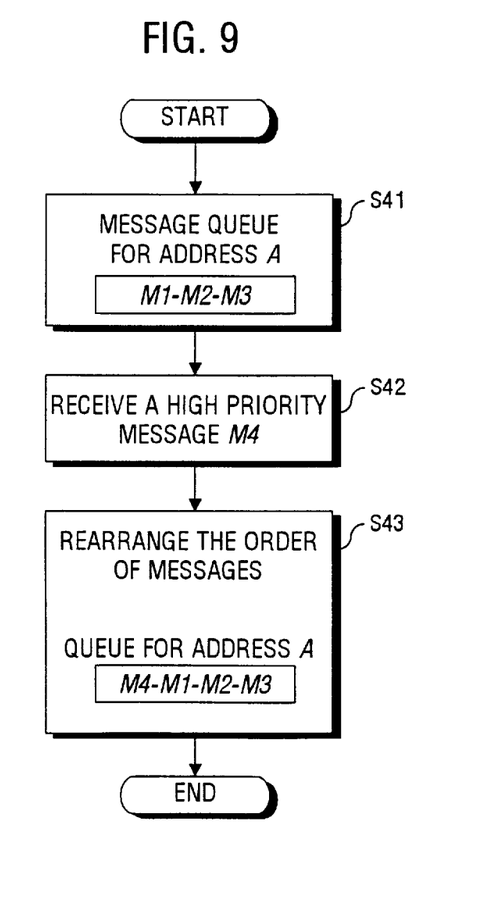
FIG. 9 is a flowchart exemplifying a procedure that a message transmission controller changes the order of messages in a transmission message queue.

FIG. 9 shows a case where the message transmission controller changes the order of messages in a message queue.

[S41] The message queue for address A contains a sequence of messages, M1-M2-M3, which entries are waiting for transmission services.

[S42] A high priority message M4 to the same address A arrives at the front-end processor from a terminal or host computer.

[S43] The message transmission controller places the new message M4 at the top of the message queue, thus rearranging the queue as M4-M1-M2-M3.

This rearrangement of the messages in a queue will allow emergency messages to be sent first, according to their high priority.

Figure 10:
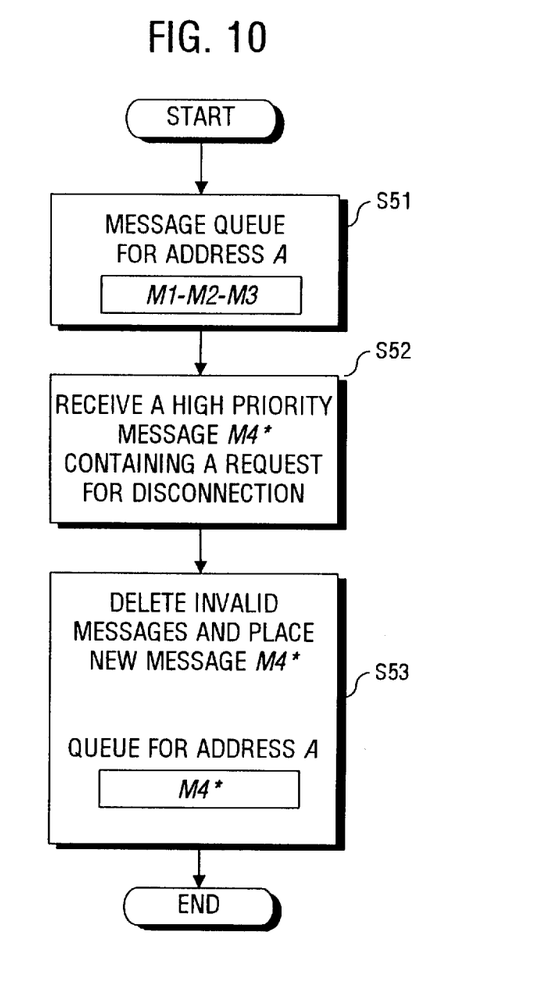
FIG. 10 is a flowchart exemplifying a procedure that the message transmission controller deletes particular messages in the queue.

FIG. 10 shows a case where the message transmission controller deletes particular messages in the message queue. The story of three steps in FIG. 10 reads as follows:

[S51] The message queue for address A contains a sequence of messages, M1-M2-M3, which entries are waiting for transmission services.

[S52] From a terminal or host computer, the message transmission controller receives a high priority message M4* to the same address A. The message M4* contains a request for disconnection of the addressed device, implying that the messages addressed to A will no longer be accepted.

[S53] Now that the existing messages M1 to M3 are made invalid, the message transmission controller removes them from the message queue and then puts the new message M4* into the queue.

As such, the front-end processor detects a request for disconnection of a certain address. Having learnt that the pending messages will be rejected, the front-end processor cancels their transmission.

Figure 11:
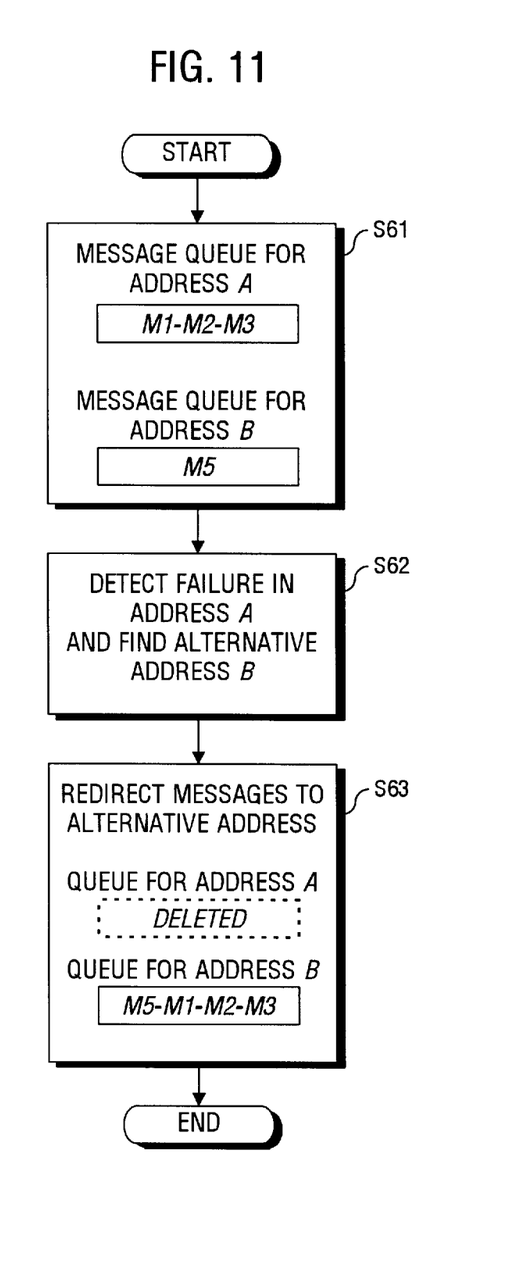
FIG. 11 is a flowchart exemplifying a procedure that the message transmission controller changes the destination address of messages.

FIG. 11 shows a case where the message transmission controller changes the destination address of particular messages. This happens when a terminal has logged out or a host processor has gone down for any reason. Since they are no longer accessible, the pending messages to that address have lost their way. The three-step story in FIG. 11 is as follows:

[S61] The message queue for address A contains a sequence of messages, M1-M2-M3, waiting for transmission services. There is another message queue for address B containing a message M5. [S62] The message transmission controller detects that the device at address A has failed and cannot communicate any longer. Then it searches the alternative address storage unit and finds that the address B is prepared as an alternative to the address A.

[S63] The pending message sequence M1-M2-M3 is added to the end of the message queue for address B, thus resulting in the new contents as M5-M1-M2-M3. The message queue for address A is now deleted.

Such redirection of messages allows the system to continue its operation even when there is a problem that may suddenly invalidate the destination address of the pending messages.

The above discussion will be summarized as follows. According to the present invention, each front-end processor monitors its subordinate terminals and provides the host computer with terminal information together with its own front-end processor ID number. The terminal information describes the subordinate terminals of the front-end processor, indicating their session status, terminal ID number, transaction status, performance level, code system, etc.

The host computer stores the received information at hand and, therefore, can use it at any time for confirmation of session status and transaction status of each terminal. This allows the host computer to start transaction quickly, thus improving the performance of the network computing system.

The terminal information stored in the host computer is automatically updated in a timely manner, being triggered by every possible event such as logging-in, logging-out, start of transaction, and end of transaction. This allows the host computer to manage the terminals easily and efficiently.

The front-end processor has extended capability for managing the messages waiting for transmission in a message queue. It includes functions such as inquiring the host status in advance, rearranging the transmission order, deleting invalidated messages, and redirecting messages. This enables efficient use of processor resources and improves the message distribution operations performed by front-end processors.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A method of managing terminals in a network computing system in which a plurality of host computers and a plurality of terminals are interconnected by a front-end processor, the method comprising the steps of:

(a) sending terminal information from the front-end processor to the plurality of host computers, said terminal information describing which of the plurality of terminals is in session with the front-end processor;

(b) storing said terminal information in the plurality of host computers; and (c) performing communication between the plurality of host computers and the terminals in session by exchanging messages through the front-end processor, using said terminal information stored in the plurality of host computers.

2. A method according to claim 1, wherein said terminal information includes status information regarding whether the terminals in session are performing a transaction with the plurality of host computers.

3. A method according to claim 1, wherein said step (a) further comprises sending an identification number of the front-end processor from the front-end processor to the plurality of host computers, wherein said step (b) further comprises storing said identification number of the front-end processor in the plurality of host computers, wherein said step (c) performs the communication using the stored identification number of the front-end processor.

4. A method according to claim 1, wherein said step (c) further comprises checking validity of a destination address of the messages at the front-end processor, and redirecting the messages to a predetermined alternative address when the destination address is invalid.

5. A method according to claim 1, wherein the communication performed in said step (c) includes broadcasting a message from the plurality of host computers to the terminals in session.

6. A method according to claim 1, said step (a) further comprising obtaining workload status information regarding the plurality of host computers prior to sending the terminal information, and determining, based on the workload status information, whether the terminal information is sent to the plurality of host computers.

7. A method according to claim 1, wherein said step (c) further comprises rearranging the messages in a message queue at the front-end processor according to priority levels of the messages.

8. A method of managing terminals in a network computing system in which a host computer and a plurality of terminals are interconnected by a front-end processor, the method comprising the steps of:

(a) sending terminal information from the front-end processor to the host computer, said terminal information describing which ones of the plurality of terminals are in session with the front-end processor;

(b) storing said terminal information in the host computer; and (c) performing communication between the host computer and the terminals in session by exchanging messages through the front-end processor, using said terminal information stored in the host computer, and deleting a message that has become invalid as a result of a high priority message.

9. A system for managing terminals in a network computing system in which a host computer and a plurality of terminals are interconnected by a front-end processor, the system comprising:

terminal management means disposed in the front-end processor for sending terminal information to the host computer, said terminal information describing which of the terminals is in session with the front-end processor;

a subordinate information table disposed in the host computer for storing said terminal information;

subordinate management means disposed in the host computer for managing said terminal information stored in said subordinate information table for use in communication between the host computer and the terminals in session;

a message queue for storing messages, including a message having high priority; and a message transmission control means disposed in the front-end processor for controlling arrangement of messages stored in the message queue, wherein said message transmission control means deletes a message in the message queue invalidated due to the high priority message.

10. A system for managing terminals in a network computing system in which a plurality of host computers and a plurality of terminals are interconnected by a front-end processor, the system comprising:

terminal management means disposed in the front-end processor for sending terminal information to the plurality of host computers, said terminal information describing which of the plurality of terminals are in session with the front-end processor;

a subordinate information table disposed in the plurality of host computers for storing said terminal information; and subordinate management means disposed in the plurality of host computers for managing said terminal information stored in said subordinate information table for use in communication between the plurality of host computers and the terminals in session.

11. A system according to claim 10, wherein the plurality of host computers broadcasts a message to the terminals in session using said terminal information.

12. A system according to claim 10, wherein said terminal information sent by said terminal management means includes status information regarding whether the terminals in session are performing a transaction with the host computer.

13. A system according to claim 10, wherein the front-end processor has an identification number, and said terminal management means sends the identification number to the plurality of host computers.

14. A system according to claim 10, said terminal management means further comprising obtaining workload status information regarding the plurality of host computers prior to sending the terminal information, and determines, based on the workload status information, whether the terminal information is sent to the plurality of host computers.

15. A system according to claim 10, further comprising a message queue and a message transmission control means disposed in the front-end processor for controlling arrangement of messages in the message queue.

16. A system according to claim 15, wherein said message transmission control means rearranges the messages in the message queue according to priority levels of the messages.

17. A system according to claim 15, wherein the messages include corresponding destination addresses, and wherein said message transmission control means checks validity of the destination address of each message at the front-end processor and redirects the message to a predetermined alternative address, when the destination address is invalid.

* * * * *

UNITED STATES PATENT AND TRADEMARK OFFICE
CERTIFICATE OF CORRECTION

PATENT NO. : 5,872,929
DATED : Feb. 16, 1999
INVENTOR(S) : Masaya Naito

It is certified that error appears in the above-identified patent and that said Letters Patent is hereby corrected as shown below:

Col. 2, lines 44-45, "comprise" should be --comprises--.

Col. 7, line 38, after "M5." START A NEW PARAGRAPH.

Signed and Sealed this

Seventh Day of September, 1999

Attest:

Q. TODD DICKINSON

*Attesting Officer*  *Acting Commissioner of Patents and Trademarks*